(12) United States Patent
Fukuda et al.

(10) Patent No.: US 11,383,713 B2
(45) Date of Patent: Jul. 12, 2022

(54) ASSIST APPARATUS AND ASSIST METHOD

(71) Applicant: DENSO CORPORATION, Kariya (JP)

(72) Inventors: Shotaro Fukuda, Kariya (JP); Koji Fujiki, Kariya (JP)

(73) Assignee: DENSO CORPORATION, Kariya (JP)

( * ) Notice: Subject to any disclaimer, the term of this patent is extended or adjusted under 35 U.S.C. 154(b) by 261 days.

(21) Appl. No.: 16/301,865

(22) PCT Filed: May 16, 2017

(86) PCT No.: PCT/JP2017/018390
§ 371 (c)(1),
(2) Date: Nov. 15, 2018

(87) PCT Pub. No.: WO2017/199965
PCT Pub. Date: Nov. 23, 2017

(65) Prior Publication Data
US 2019/0152484 A1 May 23, 2019

(30) Foreign Application Priority Data

May 16, 2016 (JP) .............................. JP2016-097975
May 1, 2017 (JP) .............................. JP2017-091307

(51) Int. Cl.
*B60W 30/18* (2012.01)
*B60W 50/14* (2020.01)
*B60Q 9/00* (2006.01)
*B60W 40/04* (2006.01)
*G08G 1/16* (2006.01)

(52) U.S. Cl.
CPC ....... *B60W 30/18163* (2013.01); *B60Q 9/008* (2013.01); *B60W 40/04* (2013.01);
(Continued)

(58) Field of Classification Search
CPC .......... B60W 30/18163; B60W 40/04; B60W 50/14; B60W 2554/801; B60W 2554/803;
(Continued)

(56) References Cited

U.S. PATENT DOCUMENTS 5,521,579 A * 5/1996 Bernhard .............. B60W 30/16
340/438
9,475,491 B1 * 10/2016 Nagasaka ....... B60W 30/18163
(Continued)

FOREIGN PATENT DOCUMENTS

JP  2008-094111 A  4/2008
JP  2015-103115 A  6/2015
(Continued)

OTHER PUBLICATIONS

English Translation: Hirotoshi, JP 2015103115 A, Jun. 2015, Japenese Patent Publication (Year: 2015).*

*Primary Examiner* — Nadeem Odeh
(74) *Attorney, Agent, or Firm* — Maschoff Brennan

(57) ABSTRACT

An assist apparatus includes a second detection section, a first calculation section, and a notification section. The second detection section detects, as a region candidate which is a candidate for a region to which the own vehicle makes a lane change, one of one or more inter-vehicle regions sandwiched between two approaching vehicles one of which is located ahead of the other. The first calculation section calculates an acceptable distance, a vehicle A being one of the two approaching vehicles and having a relatively small relative distance to the own vehicle and a vehicle B being the other of the two approaching vehicles and having a relatively large relative distance to the own vehicle. The notification section notifies each approaching vehicle of a lane change intention, when the relative distance between the own vehicle and the vehicle A is less than the acceptable distance.

9 Claims, 3 Drawing Sheets

(52) U.S. Cl.
CPC ....... *B60W 50/14* (2013.01); *B60W 2554/801* (2020.02); *G08G 1/166* (2013.01)

(58) Field of Classification Search
CPC .......... B60W 2754/30; B60W 2756/10; B60Q 9/008; B60Q 1/346; G08G 1/166; G08G 1/167
See application file for complete search history.

(56) References Cited

U.S. PATENT DOCUMENTS

| | | | |
|---|---|---|---|
| 2005/0256630 A1* | 11/2005 | Nishira | B60W 10/04 701/96 |
| 2009/0088925 A1* | 4/2009 | Sugawara | B60W 30/12 701/41 |
| 2016/0297447 A1* | 10/2016 | Suzuki | B60W 30/18163 |
| 2016/0304097 A1* | 10/2016 | Taira | G06K 9/00791 |
| 2017/0183013 A1* | 6/2017 | Matsumoto | B60W 30/18163 |
| 2017/0232966 A1* | 8/2017 | Ishioka | B60W 10/04 701/96 |
| 2018/0061236 A1* | 3/2018 | Yamamoto | G08G 1/09 |
| 2018/0201272 A1* | 7/2018 | Takeda | B60W 30/12 |
| 2019/0092333 A1* | 3/2019 | Ishioka | B60Q 1/488 |

FOREIGN PATENT DOCUMENTS

| | | | |
|---|---|---|---|
| JP | 2015103115 A | * 6/2015 | |
| WO | WO-2007123176 A1 | * 11/2007 | ............. G08G 1/167 |

* cited by examiner

ASSIST APPARATUS AND ASSIST METHOD

CROSS-REFERENCE TO RELATED APPLICATIONS

This application is a national stage application of PCT Application No. PCT/JP2017/018390, filed on May 16, 2017, which claims the benefit of priority from Japanese Patent Application No. 2016-097975 filed with the Japan Patent Office on May 16, 2016 and Japanese Patent Application No. 2017-091307 filed with the Japan Patent Office on May 1, 2017, the contents of which are incorporated herein by reference.

TECHNICAL FIELD

The present disclosure relates to a technique for assisting a lane change.

BACKGROUND ART

Patent Literature 1 below discloses a lane change assist apparatus which assists a lane change. The lane change assist apparatus indicates an intention, to make a lane change, to a nearby vehicle which is traveling in a lane to which the lane change is made. Furthermore, the lane change assist apparatus calculates a space L which is required for making the lane change. When a traveling state of the nearby vehicle has changed after a predetermined time, the lane change assist apparatus recalculates the space L.

CITATION LIST

[Patent Literature]
  [PTL 1] JP 2015-103115 A

SUMMARY OF THE INVENTION

In Patent Literature 1, the own vehicle makes a lane change based on the space L which has been changed. On the basis of the indication of the intention of the own vehicle to make a lane change which has been provided before the space L is changed, the nearby vehicle predicts behavior which is exhibited by the own vehicle when the own vehicle makes a lane change. As a result of detailed examination, however, the inventors have found a problem in which the technique described in Patent Literature 1 interferes with traffic flow of the nearby vehicle by forcing the nearby vehicle to perform a speed adjustment, in a case where behavior which is actually exhibited by the own vehicle when the own vehicle makes a lane change does not coincide with behavior that the nearby vehicle predicted would be exhibited by the own vehicle when the own vehicle makes a lane change.

An aspect of the technique of the present disclosure preferably allows the own vehicle to make a lane change without interfering with traffic flow of nearby vehicles.

An aspect of the present disclosure is an assist apparatus which includes a first detection section, a second detection section, a first calculation section, a third detection section, a notification section, a second calculation section, a determination section, a setting section, and an assist section. The assist apparatus assists a lane change of the own vehicle.

The first detection section detects a change intention which is an intention of the own vehicle to make a lane change.

The second detection section detects one of one or more inter-vehicle regions each as a region candidate which is a candidate for a region to which the own vehicle makes a lane change, each inter-vehicle region being a region which is sandwiched between two approaching vehicles one of which is located ahead of the other, each approaching vehicle being a vehicle which is one of one or more vehicles traveling in an adjacent lane and traveling in a target region while approaching the own vehicle, the adjacent lane being a lane which is adjacent to a lane in which the own vehicle is traveling, the target region being a portion of the adjacent lane which is located ahead of the own vehicle or a portion of the adjacent lane which is located behind the own vehicle.

The first calculation section calculates an acceptable distance which is a distance between the own vehicle and a vehicle A (first vehicle), and is a distance at which a lane change of the own vehicle to a region C (first region) is acceptable by the vehicle A, the vehicle A being an approaching vehicle which is one of the two approaching vehicles and whose relative distance to the own vehicle is relatively small, a vehicle B (second vehicle) being an approaching vehicle which is the other of the two approaching vehicles and whose relative distance to the own vehicle is relatively large, the region C being a region ahead of the vehicle A or a region behind the vehicle A, whichever is closer to the own vehicle.

The third detection section detects a first relative distance and a second relative distance, the first relative distance being a relative distance between the own vehicle and the vehicle A, the second relative distance being a relative distance between the own vehicle and the vehicle B.

The notification section notifies each approaching vehicle of the change intention, when the first relative distance is less than the acceptable distance.

The second calculation section calculates a first necessary distance and a second necessary distance, the first necessary distance being a distance to be kept between the own vehicle and the vehicle A and the second necessary distance being a distance to be kept between the own vehicle and the vehicle B when the own vehicle makes a lane change to the region candidate.

The determination section determines that a lane change to the region candidate is possible, when the first relative distance is not less than the first necessary distance and the second relative distance is not less than the second necessary distance.

The setting section sets the region candidate to a lane change region which is a region to which the own vehicle makes a lane change, when the determination section has determined that the lane change to the region candidate is possible.

The assist section makes a lane change of the own vehicle to the lane change region, when the setting section has set the lane change region.

In the above configuration, the approaching vehicle is notified of the change intention at a timing at which a lane change of the own vehicle to the region C is unacceptable by the vehicle A. Accordingly, the vehicle A is less likely to predict that the own vehicle makes a lane change to the region C, and the vehicle A is more likely to predict that the own vehicle makes a lane change to a region D. The region C is the region ahead of the vehicle A or the region behind the vehicle A, whichever is closer to the own vehicle. The region D is the region ahead of the vehicle A or the region behind the vehicle A, whichever is closer to the vehicle B. Thus, a situation is less likely to occur where even though the own has an intention to make a lane change to the region D, the vehicle A predicts that the own vehicle makes a lane change to the region C. Accordingly, interference with traffic flow of nearby vehicles by forcing the vehicle A to perform a speed adjustment is less likely to occur.

This allows the own vehicle to make a lane change without interfering with traffic flow of nearby vehicles.

For a reason similar to that described above, an assist method which is another aspect of the present disclosure yields an effect similar to the aforementioned effect of the assist apparatus of the present disclosure.

Note that reference signs in parentheses stated in the claims indicate a correspondence relationship with specific means stated in an embodiment described later as an aspect and do not limit a technical scope of the present disclosure.

DESCRIPTION OF THE EMBODIMENTS

An embodiment of the present disclosure will be described with reference to the drawings.

1. General Configuration

A configuration of an assist apparatus 1 will be described with reference to FIGS. 1 and 2. The assist apparatus 1 is a vehicle-mounted apparatus which is mounted on a vehicle. The vehicle on which the assist apparatus 1 is mounted is hereinafter referred to as own vehicle. The assist apparatus 1 has a function of assisting a lane change of the own vehicle.

The assist apparatus 1 includes a microcomputer including a CPU 3 and a memory 5. The memory 5 is a semiconductor memory such as RAM, ROM, and a flash memory. The CPU 3 executes a program stored in a non-transitory tangible computer readable storage medium so that various functions of the assist apparatus 1 are implemented. In this example, the memory 5 corresponds to the non-transitory tangible computer readable storage medium which stores the program. When the program is executed, a method corresponding to the program is performed. The assist apparatus 1 can include a single microcomputer or a plurality of microcomputers. A method for implementing the functions of the assist apparatus 1 is not limited to software, and some or all elements of the functions can be implemented by using hardware in which a logic circuit, an analog circuit, and the like are combined.

Figure 1:
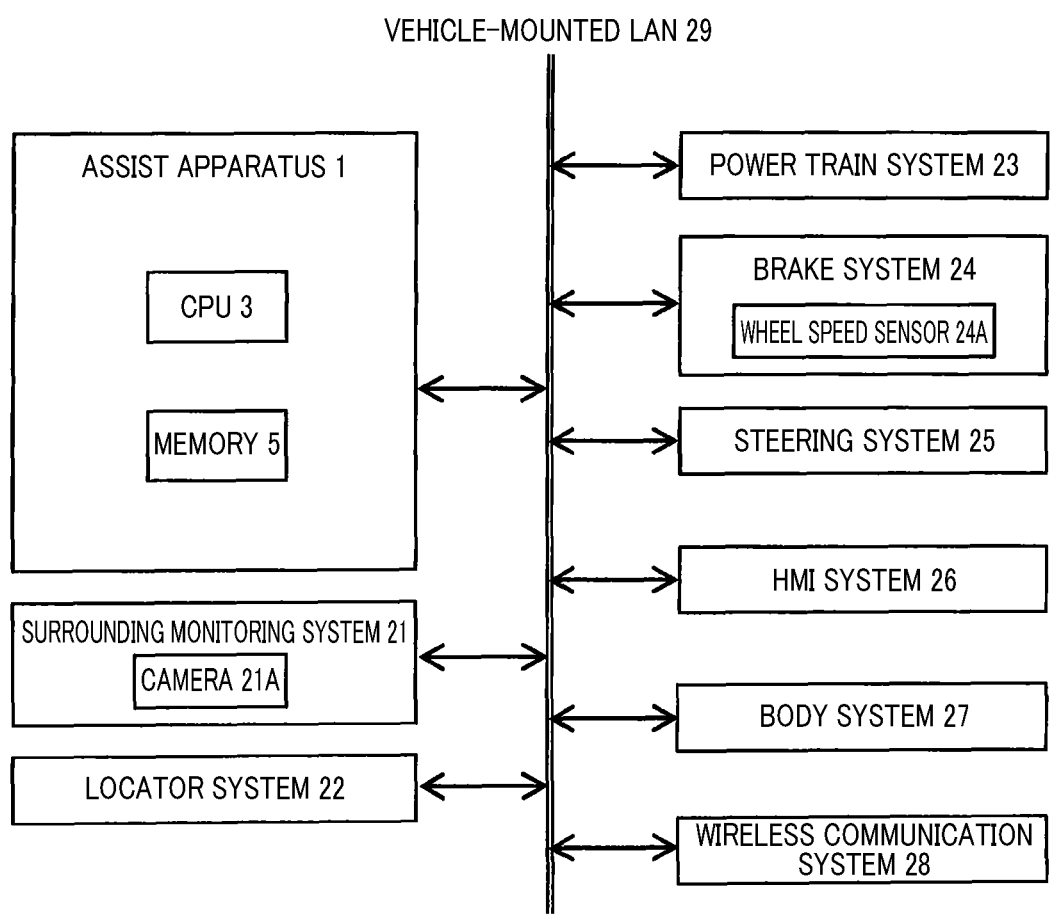
FIG. 1 is a block diagram illustrating an assist apparatus 1 and a configuration related to the assist apparatus 1.
Figure 2:
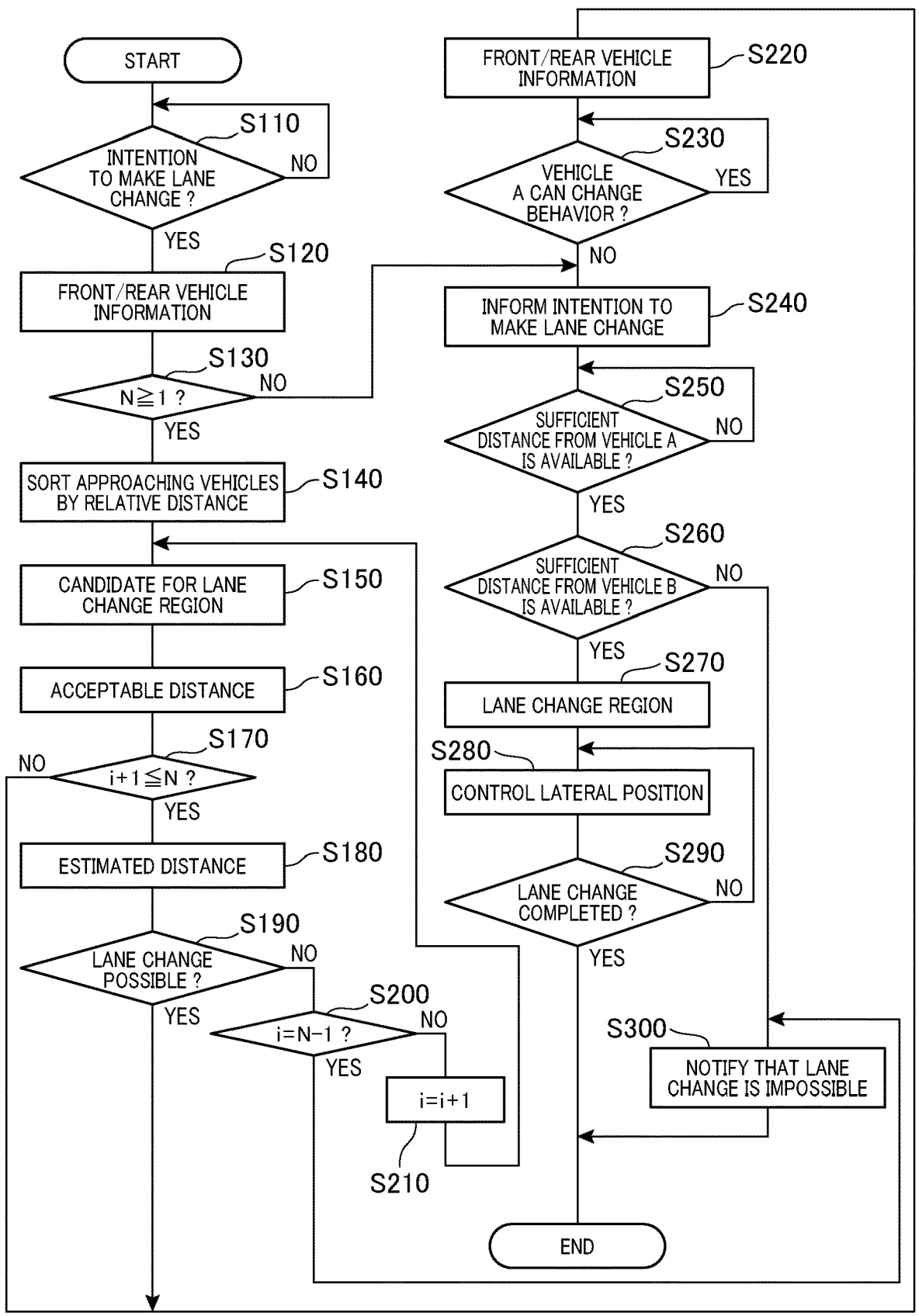
FIG. 2 is a flow chart showing an assist process.

As illustrated in FIG. 1, in addition to the assist apparatus 1, the own vehicle includes a surrounding monitoring system 21, a locator system 22, a power train system 23, a brake system 24, a steering system 25, an HMI system 26, a body system 27, and a wireless communication system 28. An HMI refers to a human machine interface.

The surrounding monitoring system 21 includes a camera 21A and another well-known sensor. The camera 21A captures an image of an area around the own vehicle and generates image data. The surrounding monitoring system 21 transmits, to the assist apparatus 1, the image data generated by the camera 21A and a result of detection performed by the sensor.

The locator system 22 includes a GPS and a storage device which stores map information. The locator system 22 has a function of acquiring a position of the own vehicle. The locator system 22 transmits information on the position of the own vehicle to the assist apparatus 1.

The power train system 23 has a function of controlling a power train of the own vehicle. The brake system 24 has a function of performing braking of the own vehicle. The brake system 24 includes a wheel speed sensor 24A. The wheel speed sensor 24A detects, as a signal, a rotating speed of a wheel of the own vehicle. The brake system 24 transmits the signal detected by the wheel speed sensor 24A to the assist apparatus 1. The assist apparatus 1 is capable of calculating a speed of the own vehicle by using the signal detected by the wheel speed sensor 24A. The steering system 25 has a function of steering the own vehicle.

The HMI system 26 accepts an operation performed by an occupant of the own vehicle. Furthermore, the HMI system 26 provides various types of information on the own vehicle to the occupant of the own vehicle.

The body system 27 has a function of performing operations such as door lock control, light control, control for switching on a turn signal, and notification of a state of the turn signal of the own vehicle. The wireless communication system 28 has a function of performing communication between vehicles and communication between the own vehicle and an infrastructure.

The assist apparatus 1, the surrounding monitoring system 21, the locator system 22, the power train system 23, the brake system 24, the steering system 25, the HMI system 26, the body system 27, and the wireless communication system 28 are components of the own vehicle. The components are connected to each other via a vehicle-mounted LAN 29. The components are capable of transmitting and receiving information via the vehicle-mounted LAN 29.

2. Process

Figure 3:
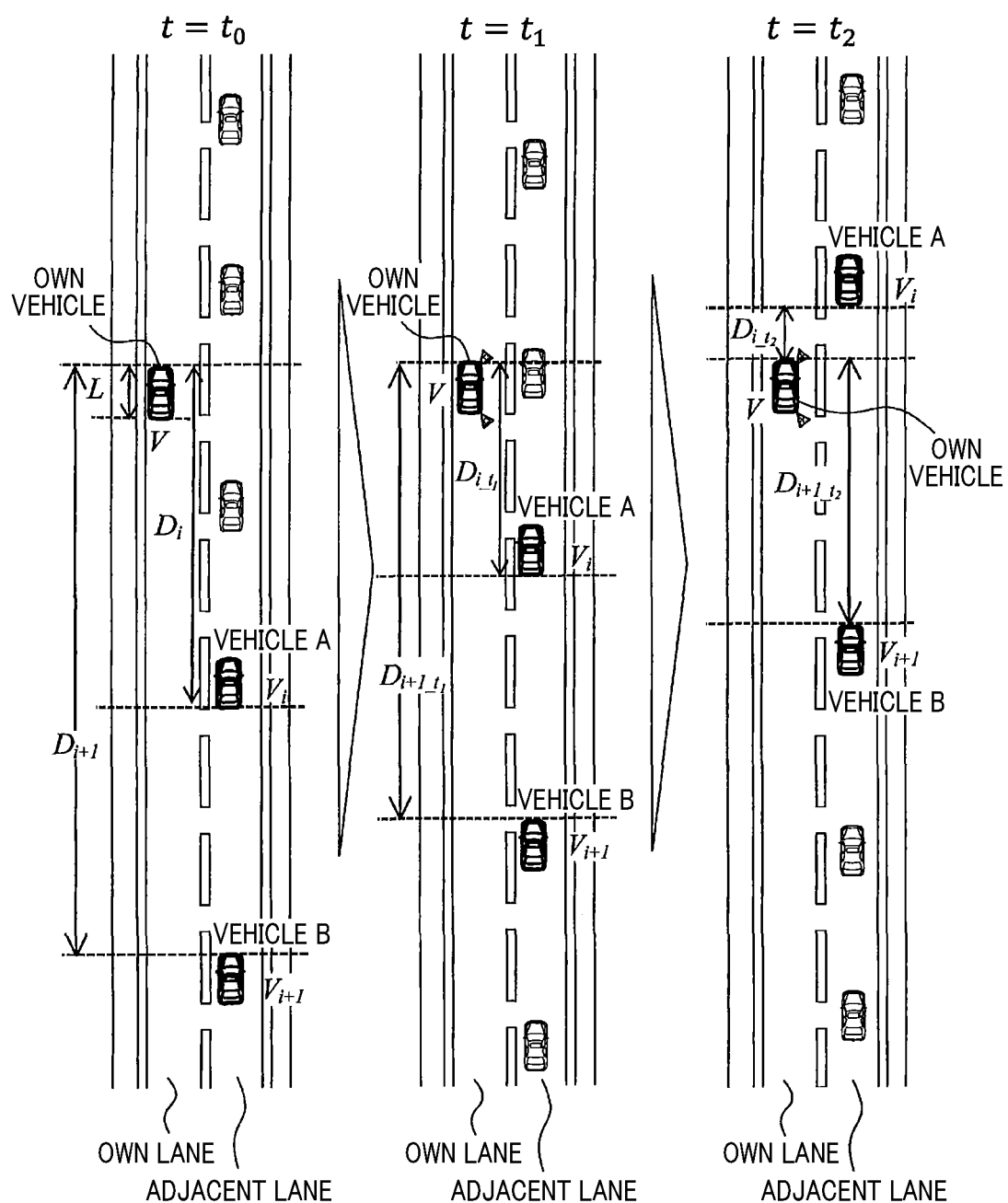
FIG. 3 is an explanatory diagram of the assist process.

A lane change assist process performed by the assist apparatus 1 will be described with reference to a flow chart in FIG. 2 and FIG. 3.

At a first step S110, the assist apparatus 1 determines whether the own vehicle makes a lane change. Specifically, when the assist apparatus 1 detects at least one of an intention of a driver to make a lane change or an intention of a system to make a lane change, the assist apparatus 1 determines that the own vehicle makes a lane change. When the assist apparatus 1 detects a steering operation or a turn signal operation, the assist apparatus 1 determines that there is the intention of the driver to make a lane change. When the assist apparatus 1 detects a lane change request outputted by a system such as the surrounding monitoring system 21 or the locator system 22, the assist apparatus 1 determines that there is the intention of the system to make a lane change. On the basis of information outputted by the system such as the surrounding monitoring system 21 or the locator system 22, the assist apparatus 1 determines whether there is a lane change request. When there is the lane change request, the assist apparatus 1 determines that there is the intention of the system to make a lane change. When the assist apparatus 1 determines that the own vehicle makes a lane change, the process proceeds to S120. When the assist apparatus 1 detects neither the intention of the driver to make a lane change nor the intention of the system to make a lane change, the assist apparatus 1 determines that the own vehicle does not make a lane change. When the assist apparatus 1 determines that the own vehicle does not make a lane change, S110 is repeated.

At S120, the assist apparatus 1 acquires information on a front/rear vehicle. The front/rear vehicle is a vehicle which is traveling in an adjacent lane. The adjacent lane is a lane which is adjacent to an own lane. The own lane is a lane in which the own vehicle is traveling. The adjacent lane is a lane to which the own vehicle makes a lane change. In the present embodiment, the front/rear vehicle is assumed to be faster than the own vehicle, and a portion of the adjacent lane which is located behind the own vehicle is referred to as target region. The front/rear vehicle which is traveling in the target region while approaching the own vehicle corresponds to an approaching vehicle. FIG. 3 shows a positional relationship between the own vehicle and the front/rear vehicle as an example. The assist apparatus 1 assigns the number of detected approaching vehicles to a variable N. When no approaching vehicle is detected, the assist apparatus 1 assigns a numerical value zero to the variable N. By using the wireless communication system 28, the assist apparatus 1 obtains a relative speed which is a speed of each of one or more approaching vehicles relative to the own vehicle and a relative distance which is a distance between each of one or more approaching vehicles and the own vehicle. Then, the process proceeds to S130.

At S130, the assist apparatus 1 determines whether one or more approaching vehicles are present. Specifically, when the variable N is not less than a numerical value 1, the assist apparatus 1 determines that one or more approaching vehicles are present. When the variable N is less than the numerical value 1, that is, when the variable N is the numerical value zero, the assist apparatus 1 determines that no approaching vehicles are present. When the assist apparatus 1 determines that one or more approaching vehicles are present, the process proceeds to S140. When the assist apparatus 1 determines that no approaching vehicles are present, the process proceeds to S230.

At S140, the assist apparatus 1 sorts information on the one or more approaching vehicles in ascending order of relative distance. Then, the process proceeds to S150.

At S150, the assist apparatus 1 detects a region candidate. The region candidate is one of one or more inter-vehicle regions and is a candidate for a region to which the own vehicle makes a lane change. The inter-vehicle region is a region which is sandwiched between two approaching vehicles one of which is located ahead of the other. At this step, as the region candidate, the assist apparatus 1 detects the inter-vehicle region which is a region sandwiched between a vehicle A (first vehicle) which is an (i)th approaching vehicle behind the own vehicle and a vehicle B (second vehicle) which is an (i+1)th approaching vehicle behind the own vehicle. The vehicle A corresponds to a vehicle which is one of the two approaching vehicles and whose relative distance to the own vehicle is relatively small. That is to say, the vehicle A corresponds to a vehicle that relative distance to the own vehicle is smaller than relative distance between the own vehicle and the vehicle B. The vehicle B corresponds to a vehicle which is the other of the two approaching vehicles and whose relative distance to the own vehicle is relatively large. That is to say, the vehicle B corresponds to a vehicle that relative distance to the own vehicle is larger than relative distance between the own vehicle and the vehicle A. Then, the process proceeds to S160.

At S160, the assist apparatus 1 calculates an acceptable distance $D_{rc}$. The acceptable distance $D_{rc}$ is a minimum inter-vehicle distance between the own vehicle and the vehicle A at which a lane change of the own vehicle to a region C (first region) is acceptable by the vehicle A. The region C is a region ahead of the vehicle A or a region behind the vehicle A, whichever is closer to the own vehicle. The acceptable distance $D_{rc}$ is calculated by the following equation (1).

[Math. 1]

$$D_{rc} = \frac{(V_i - V)^2}{A_{max}} \quad (1)$$

$V_i$ is a traveling speed of the vehicle A. V is a traveling speed of the own vehicle. Thus, "$V_i-V$" is a relative speed between the own vehicle and the vehicle A. $A_{max}$ is a deceleration rate of an approaching vehicle which is achievable by a driver of the approaching vehicle when the driver of the approaching vehicle accepts a lane change of the own vehicle to an area ahead of the approaching vehicle. $A_{max}$ is set in advance in consideration of an acceptable degree of distance between vehicles for the driver.

Then, the process proceeds to S170.

At S170, the assist apparatus 1 determines whether determination of whether the lane change is possible has been made for all of the approaching vehicles. Specifically, when a value obtained by adding the numerical value 1 to a variable i is not more than the variable N, the assist apparatus 1 determines that the determination of whether the lane change is possible has not been made for all of the approaching vehicles. When the value obtained by adding the numerical value 1 to the variable i is greater than the variable N, the assist apparatus 1 determines that the determination of whether the lane change is possible has been made for all of the approaching vehicles. When the assist apparatus 1 determines that the determination of whether the lane change is possible has not been made for all of the approaching vehicles, the process proceeds to S180. When the assist apparatus 1 determines that the determination of whether the lane change is possible has been made for all of the approaching vehicles, the process proceeds to S220.

At S180, the assist apparatus 1 calculates an estimated distance $D_{i+1\_t2}$. The estimated distance $D_{i+1\_t2}$ is a distance between the own vehicle and the vehicle B which is estimated when the own vehicle makes a lane change.

The estimated distance $D_{i+1\_t2}$ is calculated by the following equation (2).

[Math. 2]

$$D_{i+1\_t2}=D_{i+1\_t1}-(\tfrac{1}{2}A_{min}T_{dc}^2+\Delta V_{i+1}T_{dc}) \quad (2)$$

The estimated distance is a distance between the own vehicle and the vehicle B which is estimated at a timing $t_1$ at which a lane change is notified. $A_{min}$ is a minimum deceleration rate of an approaching vehicle which is achievable by a driver of the approaching vehicle when the driver of the approaching vehicle accepts a lane change of the own vehicle to an area ahead of the approaching vehicle. $A_{min}$ is set in advance in consideration of an acceptable degree of distance between vehicles for the driver.

$T_{dc}$ is an allowed time which is available for a driver of the vehicle A who has noticed an indication of an intention of the own vehicle to make a lane change to perform a speed adjustment. $\Delta V_{i+1}$ is a relative speed between the own vehicle and the vehicle B.

$T_{dc}$ is calculated by the following equation (3).

[Math. 3]

$$T_{dc}=\Delta T_{i+1}-T_{rc} \qquad (3)$$

$\Delta T_{i+1}$ is time which is required from the timing $t_1$ at which a lane change is notified to a timing $t_2$ at which a lane change is made.

$T_{rc}$ is the time which is required for a driver of an approaching vehicle to recognize a lane change of the own vehicle to an area ahead of the approaching vehicle. $T_{rc}$ is set in advance in consideration of ability of the driver to recognize a lane change.

$\Delta T_{i+1}$ is calculated by the following equation (4).

[Math. 4]

$$\Delta T_{i+1}=t_{i+1}-t_i=\frac{D_f+D_{i\_t1}}{\Delta V_i} \qquad (4)$$

$D_f$ is a minimum distance to be kept between the own vehicle and the vehicle A when the own vehicle makes a lane change to the region candidate. $D_f$ corresponds to a first necessary distance. The estimated distance $D_{i\_t1}$ is a distance between the own vehicle and the vehicle A which is estimated at the timing $t_1$ at which a lane change is notified. $\Delta V_i$ is a relative speed between the own vehicle and the vehicle A.

$D_f$ is calculated by the following equation (5).

[Math. 5]

$$|D_f=a_i\Delta V_i+b_iV_i+c_i \qquad (5)$$

$a_i$ is a predicted time which is required before the vehicle A collides with the own vehicle in a case where there is a speed difference between the own vehicle and the vehicle A when the own vehicle makes a lane change. $b_i$ is an inter-vehicle time to be kept between the own vehicle and the vehicle A in a case where there is no speed difference between the own vehicle and the vehicle A when the own vehicle makes a lane change. $a_i$, $b_i$, $c_i$, and $\Delta V_i$ are set in advance in consideration of an acceptable degree of distance between vehicles for the driver. The product of $a_i$ and $\Delta V_i$ is a distance to be kept in order for the own vehicle or the vehicle A to perform a speed adjustment, after the own vehicle makes a lane change. The product of $b_i$ and $V_i$ is a distance to be kept between the own vehicle and the vehicle A after the own vehicle or the vehicle A performs the speed adjustment. $c_i$ is a distance to be kept between the own vehicle and the vehicle A when both of the own vehicle and the vehicle A are stationary.

Then, the process proceeds to S190.

At S190, the assist apparatus 1 determines whether a lane change to the region candidate is possible. Specifically, when the following equations (6) and (7) are satisfied, the assist apparatus 1 determines that the lane change to the region candidate is possible. Otherwise, the assist apparatus 1 determines that the lane change to the region candidate is impossible. The region candidate in this case is a region sandwiched between the vehicle A which is the (i)th vehicle behind the own vehicle and the vehicle B which is the (i+1)th vehicle behind the own vehicle. When the assist apparatus 1 determines that the lane change is possible, the process proceeds to S220. When the assist apparatus 1 determines that the lane change is impossible, the process proceeds to S200.

[Math. 6]

$$D_{i\_t2} \geq D_f \qquad (6)$$

$$D_{i+1\_t2} \geq D_r+L \qquad (7)$$

$D_i$ is a distance from a front end of the own vehicle to a rear end of to (i)th vehicle (the vehicle A in FIG. 3) behind the own vehicle. $D_{i+1}$ is a distance from the front end of the own vehicle to a front end of an (i+1)th vehicle (the vehicle B in FIG. 3) behind the own vehicle. $D_r$ is a minimum distance to be kept between the own vehicle and the vehicle B when the own vehicle makes a lane change to the region candidate. $D_r$ corresponds to a second necessary distance. L is a linear dimension of the own vehicle. $D_r$ is calculated by the following equation (8).

[Math. 7]

$$|D_r=a_{i+1}\Delta V_{i+1}+b_{i+1}V+c_{i+1} \qquad (8)$$

$a_{i+1}$ is the predicted time which is required before the own vehicle collides with the vehicle B in a case where there is a speed difference between the own vehicle and the vehicle B when the own vehicle makes a lane change. $\Delta V_{i+1}$ is a relative speed between the own vehicle and the vehicle B. $b_{i+1}$ is inter-vehicle time to be kept between the own vehicle and the vehicle B in a case where there is no speed difference between the own vehicle and the vehicle B when the own vehicle makes a lane change. $a_{i+1}$, $b_{i+1}$, $c_{i+1}$, and $\Delta V_{i+1}$ are set in advance in consideration of an acceptable degree of distance between vehicles for the driver. The product of $a_{i+1}$ and $\Delta V_{i+1}$ is a distance to be kept in order for the own vehicle or the vehicle B to perform a speed adjustment, after the own vehicle makes a lane change. The product of $b_{i+1}$ and V is a distance to be kept between the own vehicle and the vehicle B after the own vehicle or the vehicle B performs the speed adjustment. $c_{i+1}$ is a distance to be kept between the own vehicle and the vehicle B when both of the own vehicle and the vehicle B are stationary.

At S200, the assist apparatus 1 determines whether determination of whether the lane change is possible has been made for all of the approaching vehicles. Specifically, when the variable i is equal to a value obtained by subtracting the numerical value 1 from the variable N, the assist apparatus 1 determines that the determination of whether the lane change is possible has been made for all of the approaching vehicles. Otherwise, the assist apparatus 1 determines that the determination of whether the lane change is possible has not been made for all of the approaching vehicles. When the assist apparatus 1 determines that the determination of whether the lane change is possible has been made for all of the approaching vehicles, the process proceeds to S300. When the assist apparatus 1 determines that the determination of whether the lane change is possible has not been made for all of the approaching vehicles, the process proceeds to S210.

At S210, the assist apparatus 1 increments the variable i. Then, the process proceeds to S160.

At S220, the assist apparatus 1 updates the information on the front/rear vehicle. This process is similar to the process in S120. Then, the process proceeds to S230.

At S230, the assist apparatus 1 determines whether the vehicle A can change behavior. Specifically, when the relative distance $D_i$ between the own vehicle and the vehicle A is not less than the acceptable distance $D_{rc}$, the assist apparatus 1 determines that the vehicle A can change its behavior. When the relative distance $D_i$ is less than the acceptable distance $D_{rc}$, the assist apparatus 1 determines that the vehicle A cannot change its behavior. The relative distance D corresponds to a first relative distance. When the assist apparatus 1 determines that the vehicle A can change its behavior, S230 is repeated. When the assist apparatus 1 determines that the vehicle A cannot change its behavior, the process proceeds to S240.

At S240, the assist apparatus 1 controls the HMI system 26 and the wireless communication system 28 so that the approaching vehicle is notified by such means as audio or visual indication or communication that the own vehicle has an intention to make a lane change. Then, the process proceeds to S250.

At S250, the assist apparatus 1 determines whether sufficient distance between the own vehicle and the vehicle A is available. Specifically, when the relative distance $D_i$ is not less than the required distance $D_f$, the assist apparatus 1 determines that sufficient distance between the own vehicle and the vehicle A is available. When the relative distance $D_i$ is less than the required distance $D_f$, the assist apparatus 1 determines that sufficient distance between the own vehicle and the vehicle A is not available. When the assist apparatus 1 determines that sufficient distance between the own vehicle and the vehicle A is not available, S250 is repeated. When the assist apparatus 1 determines that sufficient distance between the own vehicle and the vehicle A is available, the process proceeds to S260.

At S260, the assist apparatus 1 determines whether sufficient distance between the own vehicle and the vehicle B is available. Specifically, when the relative distance $D_{i+1}$ between the own vehicle and the vehicle B is not less than the required distance $D_r$, the assist apparatus 1 determines that sufficient distance between the own vehicle and the vehicle B is available. When the relative distance $D_{i+1}$ is less than the required distance $D_r$, the assist apparatus 1 determines that sufficient distance between the own vehicle and the vehicle B is not available. The relative distance $D_{i+1}$ corresponds to a second relative distance. When the assist apparatus 1 determines that sufficient distance between the own vehicle and the vehicle B is available, the process proceeds to S270. When the assist apparatus 1 determines that sufficient distance between the own vehicle and the vehicle B is not available, the process proceeds to S300.

At S270, the assist apparatus 1 sets the region candidate to a lane change region which is a region to which a lane change is made. Then, the process proceeds to S280.

At S280, the assist apparatus 1 assists a lane change. Specifically, the assist apparatus 1 controls the power train system 23, the brake system 24, and the steering system 25 so that a position of the own vehicle in a left-right direction is controlled. Then, the process proceeds to S290.

At S290, the assist apparatus 1 determines whether the lane change has been completed. Specifically, by controlling the locator system 22, the assist apparatus 1 determines whether the own vehicle is located in the adjacent lane. When the own vehicle is located in the adjacent lane, the assist apparatus 1 determines that the lane change has been completed. When the own vehicle is not located in the adjacent lane, the assist apparatus 1 determines that the lane change has not been completed. When the assist apparatus 1 determines that the lane change has been completed, the process ends. When the assist apparatus 1 determines that the lane change has not been completed, the process proceeds to S280.

At S300, the assist apparatus 1 notifies that the lane change is impossible. Specifically, the assist apparatus 1 controls the HMI system 26 so that the driver is notified by such means as audio or visual indication that the lane change is impossible. Then, the process ends.

In the present embodiment, S110 corresponds to a first detection section. S150 corresponds to a second detection section. S160 corresponds to a first calculation section. S220 corresponds to a third detection section. S230 and S240 correspond to a notification section. S250 and S260 correspond to a second calculation section and a determination section. S270 corresponds to a setting section. S280 and S290 correspond to an assist section. S300 corresponds to a notification section.

3. Effects

A first embodiment which has been described in detail yields the following effect.

That is, the approaching vehicle is notified of the change intention at a timing at which a lane change of the own vehicle to the region C is unacceptable by the vehicle A. Accordingly, the vehicle A is less likely to predict that the own vehicle makes a lane change to the region C, and the vehicle A is more likely to predict that the own vehicle makes a lane change to a region D. The region C is the region ahead of the vehicle A or the region behind the vehicle A, whichever is closer to the own vehicle. The region D (second region) is the region ahead of the vehicle A or the region behind the vehicle A, whichever is closer to the vehicle B. Thus, a situation is less likely to occur where even though the own vehicle has an intention to make a lane change to the region D, the vehicle A predicts that the own vehicle makes a lane change to the region C. Accordingly, interference with traffic flow of nearby vehicles by forcing the vehicle A to perform a speed adjustment is less likely to occur.

This allows the own vehicle to make a lane change without interfering with traffic flow of nearby vehicles.

4. Other Embodiments

Although the embodiment of the prevent disclosure has been described above, the technique of the present disclosure is not limited to the aforementioned embodiment and can be variously modified.

(1) In the aforementioned embodiment, the front/rear vehicle is assumed to be faster than the own vehicle, and the portion of the adjacent lane which is located behind the own vehicle is the target region. However, the technique of the prevent disclosure is not limited to this. The front/rear vehicle can be assumed to be slower than the own vehicle, and a portion of the adjacent lane which is located ahead of the own vehicle can be the target region.

(2) In the aforementioned embodiment, a plurality of functions of a single component can be implemented by a plurality of components, or a single function of a single component can be implemented by a plurality of components. A plurality of functions of a plurality of components can be implemented by a single component, or a single function of a plurality of components can be implemented by a single component. Part of the configuration of the aforementioned embodiment can be omitted. At least part of the configuration of the aforementioned embodiment can be added to or substituted by another configuration of the aforementioned embodiment. Any aspect included in a technical idea specified only by the wording of the claims is an embodiment of the present disclosure.

(3) Other than the aforementioned assist apparatus 1, the technique of the present disclosure can also be implemented in various forms such as a system including the assist apparatus 1 as a component, a program for functioning a computer as the assist apparatus 1, a non-transitory tangible computer readable storage medium, such as semiconductor memory, in which the program is stored, and an assist method.

The invention claimed is:

1. An assist apparatus which assists a lane change of an own vehicle, the assist apparatus comprising:
   a first detection section configured to detect a change intention, which is an intention of the own vehicle to make the lane change;
   a second detection section configured to detect one of one or more inter-vehicle regions, each as a region candidate, which is a candidate for a region to which the own vehicle makes lane change, each inter-vehicle region being a region that is sandwiched between two approaching vehicles, one of which is located ahead of the other, each approaching vehicle being a vehicle that is one of one or more vehicles traveling in an adjacent lane and traveling in a target region while approaching the own vehicle, the adjacent lane being a lane that is adjacent to a lane in which the own vehicle is traveling, the target region being a portion of the adjacent lane that is located ahead of the own vehicle or a portion of the adjacent lane that is located behind the own vehicle;
   a first calculation section configured to calculate an acceptable distance, which is a distance between the own vehicle and a first vehicle A at which the lane change of the own vehicle to a first region C is acceptable by the first vehicle A, the first region C being a region ahead of the first vehicle A or a region behind the first vehicle A, whichever is closer to the own vehicle, the acceptable distance calculated based on a predetermined maximum acceptable deceleration rate of the first vehicle A for a case in which the first vehicle A were to accept the lane change of the own vehicle into the first region C, in which the first region C is ahead of the first vehicle A, the first vehicle A being an approaching vehicle that is one of the two approaching vehicles and a second vehicle B being an approaching vehicle that is the other of the two approaching vehicles and a relative distance from first vehicle A to the own vehicle being smaller than a relative distance from the second vehicle B to the own vehicle;
   a third detection section configured to detect a first relative distance and a second relative distance, the first relative distance comprising the relative distance between the own vehicle and the first vehicle A, the second relative distance comprising the relative distance between the own vehicle and the second vehicle B;
   a first notification section configured to determine that the first vehicle A cannot change its behavior under conditions that the own vehicle is located ahead of the first vehicle A and the first relative distance is less than the acceptable distance, and notify each approaching vehicle of the change intention, in response to determining that the first vehicle A cannot change its behavior;
   a second calculation section configured to calculate a first necessary distance and a second necessary distance, the first necessary distance being a distance to be kept between the own vehicle and the first vehicle A and the second necessary distance being a distance to be kept between the own vehicle and the second vehicle B when the own vehicle makes the lane change to the region candidate;
   a determination section configured to determine that the lane change to the region candidate is possible, in response to determining that the first relative distance is not less than the first necessary distance and the second relative distance is not less than the second necessary distance;
   a setting section configured to set the region candidate to a lane change region which is a region to which the own vehicle makes the lane change, in response to determining that that the lane change to the region candidate is possible; and
   an assist section configured to make the lane change of the own vehicle to the lane change region, in response to setting the lane change region.

2. The assist apparatus according to claim 1, wherein the second detection section detects the one or more inter-vehicle regions as the region candidate in ascending order of distance from the own vehicle.

3. The assist apparatus according to claim 1, wherein the determination section determines that the lane change to the region candidate is impossible when the first relative distance is less than the first necessary distance or the second relative distance is less than the second necessary distance,
   the assist apparatus further comprising a second notification section configured to notify a driver of the own vehicle that the lane change to the region candidate is impossible in response to determining that the lane change to the region candidate is impossible.

4. An assist method for assisting a lane change of an own vehicle, the assist method comprising:
   detecting a change intention, which is an intention of the own vehicle to make the lane change;
   detecting one of one or more inter-vehicle regions each as a region candidate which is a candidate for a region to which the own vehicle makes the lane change, each inter-vehicle region being a region that is sandwiched between two approaching vehicles one of which is located ahead of the other, each approaching vehicle being a vehicle that is one of one or more vehicles traveling in an adjacent lane and traveling in a target region while approaching the own vehicle, the adjacent lane being a lane that is adjacent to a lane in which the own vehicle is traveling, the target region being a portion of the adjacent lane that is located ahead of the own vehicle or a portion of the adjacent lane which is located behind the own vehicle;
   calculating an acceptable distance which is a distance between the own vehicle and a first vehicle A at which the lane change of the own vehicle to a first region C is acceptable by the first vehicle A, the first region C being a region ahead of the first vehicle A or a region behind the first vehicle A, whichever is closer to the own vehicle, the acceptable distance calculated based on a predetermined maximum acceptable deceleration rate of the first vehicle A for a case in which the first vehicle A were to accept the lane change of the own vehicle into the first region C, in which the first region C is ahead of the first vehicle A, the first vehicle A being an approaching vehicle that is one of the two approaching vehicles and a second vehicle B being an approaching vehicle which is the other of the two approaching vehicles and a relative distance from first vehicle A to the own vehicle is smaller than a relative distance from the second vehicle B to the own vehicle;

detecting a first relative distance and a second relative distance, the first relative distance comprising the relative distance between the own vehicle and the first vehicle A, the second relative distance comprising the relative distance between the own vehicle and the second vehicle B;

determining that the first vehicle A cannot change its behavior under conditions that the own vehicle is located ahead of the first vehicle A and the first relative distance is less than the acceptable distance, and notifying each approaching vehicle of the change intention, in response to determining that the first vehicle A cannot change its behavior;

calculating a first necessary distance and a second necessary distance, the first necessary distance being a distance to be kept between the own vehicle and the first vehicle A and the second necessary distance being a distance to be kept between the own vehicle and the second vehicle B when the own vehicle makes the lane change to the region candidate;

determining that the lane change to the region candidate is possible, in response to determining that the first relative distance is not less than the first necessary distance and the second relative distance is not less than the second necessary distance;

setting the region candidate to a lane change region which is a region to which the own vehicle makes the lane change, in response to determining that the lane change to the region candidate is possible; and assisting the lane change of the own vehicle to the lane change region, in response to setting the lane change region.

5. The assist method according to claim 4, wherein the one or more inter-vehicle regions are detected as the region candidate in ascending order of distance from the own vehicle.

6. The assist method according to claim 4, the assist method further comprising:
determining that the lane change to the region candidate is impossible, in response to determining that the first relative distance is less than the first necessary distance or the second relative distance is less than the second necessary distance; and
notifying a driver of the own vehicle that the lane change to the region candidate is impossible, in response to determining that the lane change to the region candidate is impossible.

7. A system for assisting a lane change of an own vehicle comprising:
a processor;
a non-transitory computer-readable storage medium; and
a set of computer-executable instructions stored on the non-transitory computer-readable storage medium that cause the processor to:
detect a change intention, which is an intention of the own vehicle to make the lane change;
detect one of one or more inter-vehicle regions each as a region candidate which is a candidate for a region to which the own vehicle makes the lane change, each inter-vehicle region being a region that is sandwiched between two approaching vehicles one of which is located ahead of the other, each approaching vehicle being a vehicle that is one of one or more vehicles traveling in an adjacent lane and traveling in a target region while approaching the own vehicle, the adjacent lane being a lane that is adjacent to a lane in which the own vehicle is traveling, the target region being a portion of the adjacent lane that is located ahead of the own vehicle or a portion of the adjacent lane which is located behind the own vehicle;

calculate an acceptable distance which is a distance between the own vehicle and a first vehicle A at which the lane change of the own vehicle to a first region C is acceptable by the first vehicle A, the first region C being a region ahead of the first vehicle A or a region behind the first vehicle A, whichever is closer to the own vehicle, the acceptable distance calculated based on a predetermined maximum acceptable deceleration rate of the first vehicle A for a case in which the first vehicle A were to accept the lane change of the own vehicle into the first region C, in which the first region C is ahead of the first vehicle A, the first vehicle A being an approaching vehicle that is one of the two approaching vehicles and a second vehicle B being an approaching vehicle which is the other of the two approaching vehicles and a relative distance from first vehicle A to the own vehicle is smaller than a relative distance from the second vehicle B to the own vehicle;

detect a first relative distance and a second relative distance, the first relative distance comprising the relative distance between the own vehicle and the first vehicle A, the second relative distance comprising the relative distance between the own vehicle and the second vehicle B;

determine that the first vehicle A cannot change its behavior under conditions that the own vehicle is located ahead of the first vehicle A and the first relative distance is less than the acceptable distance, and notify each approaching vehicle of the change intention, in response to determining that the first vehicle A cannot change its behavior;

calculate a first necessary distance and a second necessary distance, the first necessary distance being a distance to be kept between the own vehicle and the first vehicle A and the second necessary distance being a distance to be kept between the own vehicle and the second vehicle B when the own vehicle makes the lane change to the region candidate;

determine that the lane change to the region candidate is possible, in response to determining that the first relative distance is not less than the first necessary distance and the second relative distance is not less than the second necessary distance;

set the region candidate to a lane change region which is a region to which the own vehicle makes the lane change, in response to determining that the lane change to the region candidate is possible; and assist the lane change of the own vehicle to the lane change region, in response to setting the lane change region.

8. The system according to claim 7, wherein the one or more inter-vehicle regions are detected as the region candidate in ascending order of distance from the own vehicle.

9. The system according to claim 7, wherein the set of computer-executable instructions further cause the processor to:
determine that the lane change to the region candidate is impossible, in response to determining that the first relative distance is less than the first necessary distance or the second relative distance is less than the second necessary distance; and notify a driver of the own vehicle that the lane change to the region candidate is impossible, in response to determining that the lane change to the region candidate is impossible.

\* \* \* \* \*